(12) United States Patent
Bassiri et al.

(10) Patent No.: US 7,376,389 B2
(45) Date of Patent: May 20, 2008

(54) WIRELESS COMMUNICATION SYSTEM AND LIFT SYSTEM HAVING THE SAME

(75) Inventors: Masoud Bassiri, Singapore (SG); Ravikumar Jeevarathinam, Singapore (SG)

(73) Assignee: Consistel Pte Ltd., Singapore (SG)

( * ) Notice: Subject to any disclaimer, the term of this patent is extended or adjusted under 35 U.S.C. 154(b) by 0 days.

(21) Appl. No.: 10/535,435

(22) PCT Filed: Nov. 28, 2003

(86) PCT No.: PCT/SG03/00278

§ 371 (c)(1),
(2), (4) Date: May 5, 2005

(87) PCT Pub. No.: WO2005/053189

PCT Pub. Date: Jun. 9, 2005

(65) Prior Publication Data

US 2006/0046642 A1    Mar. 2, 2006

(51) Int. Cl.
*H04B 3/36* (2006.01)
*H04B 7/14* (2006.01)
*H04B 7/15* (2006.01)
*H04B 7/185* (2006.01)

(52) U.S. Cl. .................. 455/7; 455/13.1; 455/11.1

(58) Field of Classification Search ............. 455/7, 455/524, 562.1, 11.1, 13.1, 562
See application file for complete search history.

(56) References Cited

U.S. PATENT DOCUMENTS

| | | | |
|---|---|---|---|
| 5,282,239 A * | 1/1994 | Yokoi et al. | 455/465 |
| 5,349,631 A | 9/1994 | Lee | 379/59 |
| 5,603,080 A * | 2/1997 | Kallander et al. | 455/14 |
| 6,032,020 A * | 2/2000 | Cook et al. | 455/7 |
| 6,108,535 A * | 8/2000 | Moriya et al. | 455/422.1 |
| 6,195,561 B1 | 2/2001 | Rose | 455/523 |
| 6,364,066 B1 * | 4/2002 | Bolch et al. | 187/391 |
| 6,405,018 B1 * | 6/2002 | Reudink et al. | 455/20 |
| 6,504,510 B2 | 1/2003 | Kim | |
| 6,598,710 B2 * | 7/2003 | Motoyama et al. | 187/391 |
| 6,690,916 B1 | 2/2004 | Yenerim | |
| 6,701,157 B2 * | 3/2004 | Shields | 455/522 |

(Continued)

FOREIGN PATENT DOCUMENTS

TW          469725          12/2001

(Continued)

*Primary Examiner*—Nay Maung
*Assistant Examiner*—Andrew Wendell
(74) *Attorney, Agent, or Firm*—K. David Crockett, Esq.; Crockett & Crockett

(57) ABSTRACT

A wireless communication system for providing a radio frequency (RF) link between an enclosed environment that is at least substantially shielded from RF signals, and the outside of the enclosed environment is disclosed. The wireless communication system includes at least one gateway antenna arranged at an entrance point of the enclosed environment. The gateway antenna radiates downlink RF signals into and receives uplink RF signals from, the enclosed environment, respectively. The system also includes at least one auxiliary repeater arranged within the enclosed environment, a donor antenna and a server antenna. Both the donor and the server antenna are coupled to the auxiliary repeater. The auxiliary repeater relays the downlink and the uplink RF signals using the donor antenna and the server antenna. A lift system including the wireless communication system is also disclosed.

7 Claims, 6 Drawing Sheets

U.S. PATENT DOCUMENTS

| | | |
|---|---|---|
| 6,895,218 B2 * | 5/2005 | Yarkosky .................... 455/20 |
| 2001/0011009 A1 * | 8/2001 | Harada et al. ................ 455/40 |
| 2003/0211827 A1 * | 11/2003 | Yonezawa et al. ............. 455/7 |
| 2004/0110469 A1 * | 6/2004 | Judd et al. ................... 455/15 |
| 2004/0203911 A1 * | 10/2004 | Masuda et al. ......... 455/456.1 |
| 2005/0085182 A1 * | 4/2005 | Chuberre et al. ......... 455/3.01 |
| 2005/0255891 A1 * | 11/2005 | Takai ..................... 455/562.1 |

FOREIGN PATENT DOCUMENTS

| | | |
|---|---|---|
| TW | 554570 | 9/2003 |
| WO | WO 01/01666 | 1/2001 |

\* cited by examiner

WIRELESS COMMUNICATION SYSTEM AND LIFT SYSTEM HAVING THE SAME

This application is a national stage application claiming priority to International Application PCT/SG03/00278, filed Nov. 28, 2003, published as International Publication WO2005/053189.

BACKGROUND

This invention relates generally to a wireless communication system for providing radio coverage in an enclosed environment. More particularly, this invention relates to a wireless communication system for providing radio coverage in a lift car within a lift shaft.

Attenuation of radio frequency (RF) waves is a common phenomenon inside a building. The attenuation is due to obstacles such as the walls, pillars, partitions, etc. in the building that obstruct the propagation of the RF waves. Consequently, the quality of RF signal coverage inside a building is poor as compared to an open area. Designs of systems for enhancing in-building RF signal coverage have traditionally been a challenge for RF design engineers.

It is impractical to design outdoor base transceiver stations (BTS's) that are able to also provide indoor or in-building RF signal coverage. Typically, in-building RF signal coverage has been provided using an indoor BTS. This indoor BTS is able to provide uniform radio signal coverage in different parts on different floors of a building. Another means of providing in-building RF signal coverage is by using one or more distributed antenna systems that include coaxial cables and fiber optic cables. Although the indoor BTS and the distributed antenna system both enhance RF signal coverage within a building, they are unfortunately inadequate and not cost effective for providing reasonably good RF signal coverage in enclosed environments, such as within lift shafts, lift cars in the lift shafts, underground mines, tunnels etc.

One solution for extending RF signal coverage inside for example a lift car is by providing a distributed antenna in the lift lobby of each and every floor of a building. Although such a solution works to some extent for providing RF signal coverage inside a lift car, the RF signal coverage is not seamless, especially when the lift car moves between floors in the lift shaft. Such a design also places a constraint that an antenna has to be mounted in each of the lift lobbies, resulting in a system that is relatively high in cost.

Another solution is disclosed in U.S. Pat. No. 5,603,080 wherein a leakage coaxial cable is run along the length of a tunnel. However, a break in the cable would render a section of the cable non-operational to result in severe radio fading near that section. If the leakage coaxial cable is long, amplifiers or repeaters are required along the length of the cable. These amplifiers or repeaters result in a higher cost of the solution.

SUMMARY

According to an embodiment of the invention, there is provided a wireless (communication system for providing a radio frequency (RF) link between an enclosed environment that is at least substantially shielded from RF signals, and the outside of the enclosed environment. The wireless communication system includes at least one gateway antenna arranged at an entrance point of the enclosed environment so as to radiate downlink RF signals into and receive uplink RF signals from, the enclosed environment, respectively. The entrance point of the enclosed environment is a well-defined access into the enclosed environment where the gateway antenna is placed so as to radiate downlink RF signals therefrom into the enclosed environment. The entrance point should not be construed to mean an entrance for human access into the enclosed environment. If the downlink RF signals are weak, the downlink RF signals may be amplified using a primary repeater prior to transmission thereof via the gateway antenna. The wireless communication system also includes at least one auxiliary repeater arranged to be stationary within the enclosed environment, a donor antenna and a server antenna, both of which are coupled to the auxiliary repeater. The auxiliary repeater relays the downlink and the uplink RF signals using the donor antenna and the server antenna to extend the RF signal coverage within the enclosed environment. With such an embodiment of the invention, RF signal coverage may be provided and extended in an enclosed environment that includes, but not limited to, a lift shaft, a tunnel, a mine or other enclosed environments where RF fading occurs.

According to another embodiment of the invention, where RF signal coverage is to be provided in a mobile conveyance that is moveable in the enclosed environment, for example a lift car within the lift shaft or a train carriage passing through the tunnel, the auxiliary repeater may be mounted on the mobile conveyance with the donor antenna located outside the mobile conveyance and the server antenna located inside the mobile conveyance to extend RF signal coverage into the inside of the mobile conveyance. The auxiliary repeater may be inside or outside of the mobile conveyance. The server antenna may be integral with the auxiliary repeater, especially when the auxiliary repeater is mounted inside the mobile conveyance to reduce part count. When used in a lift shaft, the gateway antenna may, for example, be mounted to a ceiling of the lift shaft in an access opening therein to define an entrance point for RF signals thereat. When used in a tunnel or mine, the gateway antenna may, for example, be mounted to an entrance to the tunnel or mine to define an entrance point for RF signals thereat.

Regardless of whether the auxiliary repeater is stationary, or mounted to a mobile conveyance and therefore moveable therewith, the auxiliary repeater may preferably include a bidirectional amplifier with feedback control for adjusting its gain to maintain an output signal strength thereof within predetermined limits. In the case when the auxiliary repeater is stationary, the feedback control is useful for maintaining an output signal strength of the bidirectional amplifier within predetermined limits under varying signal strength conditions of the signal radiated by the gateway antenna. In the case when the auxiliary repeater is mounted to a mobile conveyance, the gain of the bidirectional amplifier may, alternatively or additionally, be adjusted based on a distance between the mobile conveyance and the gateway antenna. When the distance is small, the gain is reduced and when the distance is large, the gain is increased accordingly. For a mobile conveyance such as a lift car, its location within a lift shaft may be used to determine the distance between the lift car and the gateway antenna.

According to yet another embodiment of the invention, when the enclosed environment is too extensive for a single auxiliary repeater to provide adequate RF signal coverage therein, for example inside a tunnel longer than a predetermined length, the wireless communication system may include multiple auxiliary repeaters arranged spaced apart from each other in a cascade within the enclosed environment. In other words, the auxiliary repeaters are arranged in the form of one or more chains leading away from the gateway antenna. A first auxiliary repeater in a chain, closest to the gateway antenna, will receive the RF signals transmitted by the gateway antenna. This first auxiliary repeater amplifies and retransmits the RF signals. A second auxiliary repeater further along the chain would similarly receive, amplify and retransmit the RF signals transmitted by the first auxiliary repeater. In this manner, the RF signals are propagated by the multiple auxiliary repeaters to provide RF signal coverage to a larger area. The RF signals are referred to as having traversed multiple hops, each of which is the distance between two auxiliary repeaters. To avoid any loss of RF signal propagation in the chain of auxiliary repeaters, the RF signal coverage of each auxiliary repeater may be extended such that when an auxiliary repeater fails, the two auxiliary repeaters immediately adjacent thereto would still be able to provide for RF signal coverage in an area previously covered by the failed repeater.

According to yet a further embodiment of the invention, when there are moving conveyances in the enclosed environment requiring multiple auxiliary repeaters, the auxiliary repeaters may include a first group and a second group of auxiliary repeaters. The first group of auxiliary repeaters are mounted to respective mobile conveyances of a train of mobile conveyances movable in the enclosed environment, and the second group of auxiliary repeaters are arranged in the enclosed environment to be stationary outside the mobile conveyances. The donor antenna, coupled to at least one of a leading auxiliary repeater or a trailing repeater of the auxiliary repeaters in the first group, is arranged outside the mobile conveyance. The donor antennas coupled to the other auxiliary repeaters in the first group and the server antennas coupled to the auxiliary repeaters in the first group are arranged inside the respective mobile conveyance. Such an implementation is suitable, for example, for providing RF signal coverage both inside and outside of train carriages passing through a tunnel. The auxiliary repeaters in such a multi-auxiliary repeater wireless communication system may each include a bidirectional amplifier with feedback control for adjusting its gain to maintain an output signal strength thereof within predetermined limits under varying RF signal conditions.

For any of the above-described embodiments, the wireless communication system may include more than one gateway antenna arranged at respective entrance points of the enclosed environment so as to provide a redundant system. In the event that one gateway antenna fails, transmissions of another gateway antenna would still be available in the enclosed environment.

According to yet another further embodiment of the invention, the wireless communication system may further include a first and second interface, and a first and second combiner/decombiner coupled to the first and second interface respectively for providing RF signal coverage of a different frequency from that of the uplink and downlink RF signals. This RF signal coverage of a different frequency may, for example, be used to provide a wireless communication link between a control station, and a signaling and driving system which, in turn, can be utilized to control and/or monitor certain parameters of the enclosed environment and/or a moving conveyance within such an enclosed environment. Such parameters may include, but not restricted to, for example, temperature, pressure and gas levels.

The first interface is coupled to the control station for converting downlink control data into corresponding downlink control RF signals and for converting uplink signaling RF signals, from the signaling and driving system, into corresponding uplink signaling data. The first combiner/decombiner combines the downlink RF signals with the downlink control RF signals for transmission by the gateway antenna, and separates uplink RF signals from the uplink signaling RF signals received by the gateway antenna. The second interface is coupled to the signaling and driving system for converting the downlink control RF signals into driver or control signals and for converting signaling signals, e.g. signals from sensors, into the uplink signaling RF signals. The second combiner/decombiner combines the uplink RF signals with the uplink signaling RF signals for transmission by the donor antenna of the auxiliary repeater, and separates the downlink RF signals from the downlink RF control signals received by the donor antenna of the auxiliary repeater. In this manner, a single wireless communication system may be used to provide RF signal coverage for two, for example, disparate systems.

The signaling and driving system may be arranged in one or more mobile conveyance in an enclosed environment. The signaling and driving system may include a driver for controlling the mobile conveyance based on the driver signals, and a sensor for producing the signaling signals based on the status of the mobile conveyance. Such a control station, and signaling and driving system may, for example, be used in the lift system described above for monitoring and controlling the functions of the lift car. Such a system may also be used, for example, for monitoring and controlling driver-less coal cars in mines. In the lift system, the sensor may be adapted to provide information about the location of the lift car within the enclosed environment. This sensor may be connected to the auxiliary repeater so that the information can be used thereby for controlling the gain of the bidirectional amplifier of the auxiliary repeater, and also to the first interface so that the information can be used by the control station to control the location of the lift car in the lift shaft. In the lift system, the signaling and driving system may further include a signal generator that is operable by a user of the lift car, for example, to generate signals when floor or emergency buttons inside the lift car are actuated.

The signaling and driving system may also be arranged to be stationary in an enclosed environment, such as in the mine, for remote monitoring and controlling parameters, such as temperature, pressure and gas levels, in the mine.

BRIEF DESCRIPTION OF DRAWINGS

The invention will be better understood with reference to the drawings, in which.

DETAILED DESCRIPTION

Hereafter, a preferred embodiment of the invention will be described in the context of a wireless communication system that is used in a lift shaft and a lift car that is moveable in the lift shaft. The system is for extending radio frequency (RF) signal coverage, or radio coverage for short, outside of the lift shaft into the lift shaft and the lift car. However, it should not be construed that the invention is limited to use within such an enclosed environment but that the invention may be used in other enclosed environments, such as inside a tunnel, a mine etc., which are also at least substantially shielded from outside RF signals.

Figure 1:
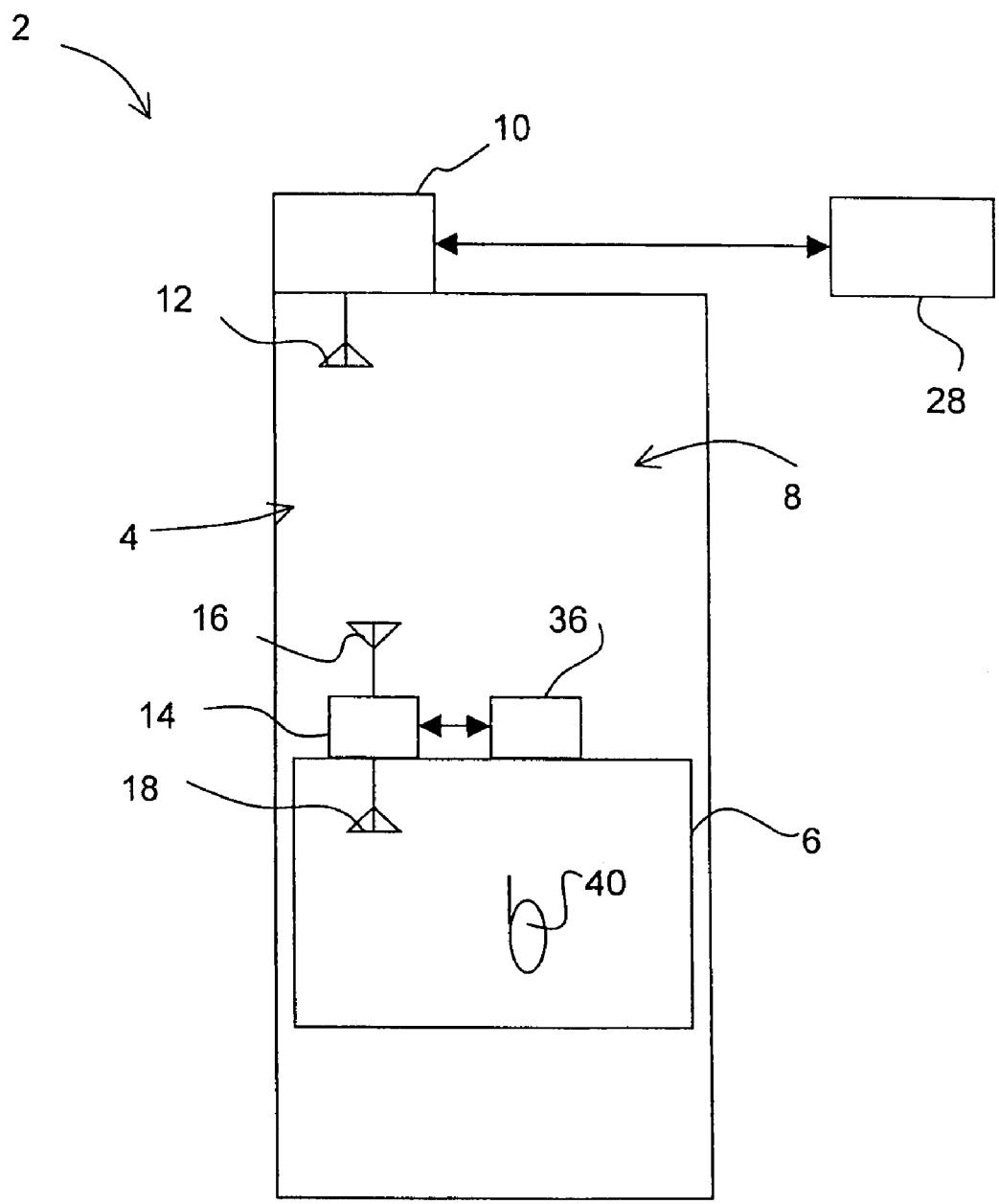
FIG. 1 is a schematic drawing of a lift system having a wireless communication system according to one embodiment of the invention.
Figure 2:
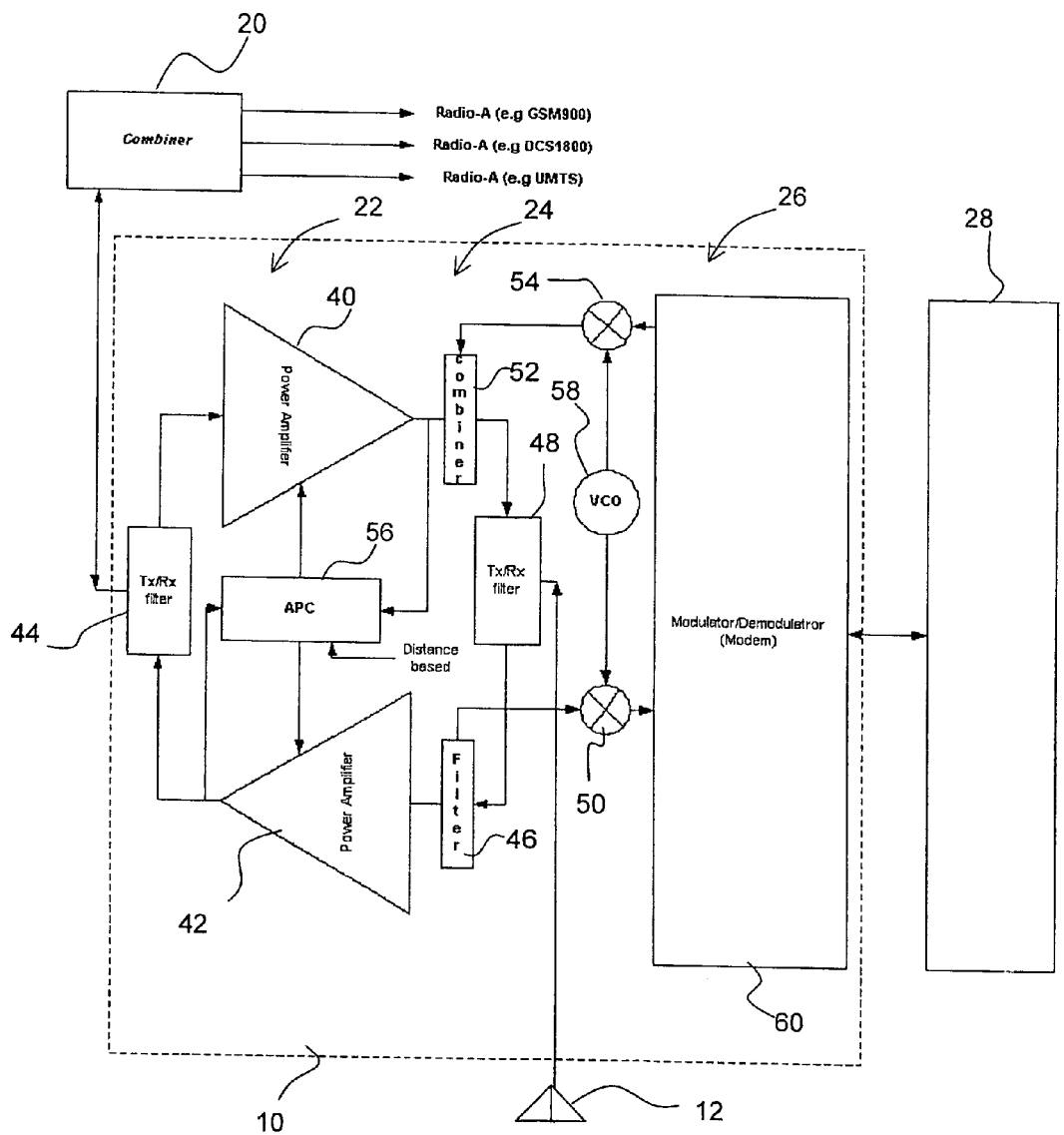
FIG. 2 is a block diagram of a primary repeater of the wireless communication system in FIG. 1.
Figure 3:
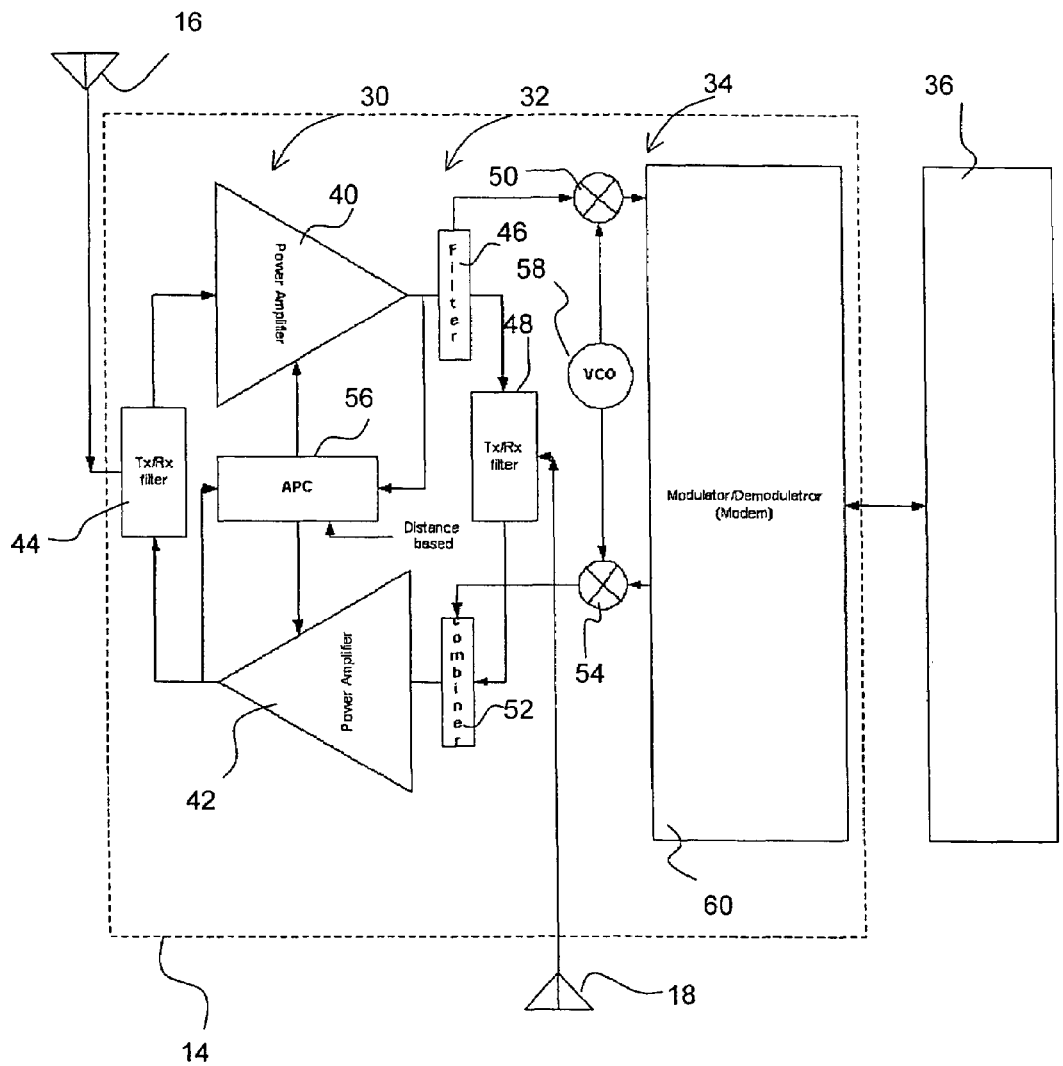
FIG. 3 is a block diagram of an auxiliary repeater of the wireless communication system in FIG. 1.

FIG. 1 is a schematic drawing of an elevator or lift system 2 that includes a wireless communication system 4 according to one embodiment of the invention for providing radio frequency (RF) signal coverage in a lift car 6 that is moveable within a lift shaft 8. The wireless communication system 4 includes a primary repeater 10 and a gateway antenna 12 coupled to the primary repeater 10. The wireless communication system 4 further includes an auxiliary repeater 14, a donor antenna 16 and a server antenna 18, both of which are coupled to the auxiliary repeater 14. FIGS. 2 and 3 are block diagrams of the primary repeater 10 and the auxiliary repeater 14 respectively.

The primary repeater 10 may be mounted inside or outside the lift shaft 8. The primary repeater 10 receives downlink RF signals from any suitable source outside of the lift shaft 8, such as a BTS (not shown), an amplifier (not shown), or a combiner 20 (FIG. 2), via a coaxial cable (not shown) connected therebetween. The gateway antenna 12 is located at an entrance point of the lift shaft 8, for example, a ceiling of the lift shaft 8: The gateway antenna 12 may also be located at other locations in the lift shaft 8 so long as it is able to direct or focus radiation of downlink RF signals into the lift shaft 8. Unlike a prior art leakage cable that is run along the length of a lift shaft 8, this gateway antenna 12 is localized or located at a single point within the lift shaft 8. The gateway antenna 12 is a directional antenna, such as but not limited to a panel or yagi antenna. The donor antenna 16 is generally a directional antenna and the server antenna 18 is generally an omni directional antenna. The auxiliary repeater 14 is mounted on the roof of the lift car 6 with the donor antenna 16 and the server antenna 18 located outside and inside of the lift car 6 respectively. The donor antenna 16 is arranged such that it is in the line-of-sight with the gateway antenna 12. Alternatively, the auxiliary repeater 14 may be mounted to the ceiling of the lift car 6. In such a case, the server antenna 18 may be integral with the auxiliary repeater 14.

The primary repeater 10 is next described with reference to FIG. 2. The primary repeater 10 includes a first bidirectional amplifier 22, a first combiner/decombiner 24 and a first interface 26. The first bidirectional amplifier 22 amplifies both mobile communication downlink RF signals, from outside of the lift shaft 8, and mobile communication uplink RF signals, from inside the lift shaft 8. The first interface 26 is coupled to a control station 28 for converting downlink control data from the control station 28 into corresponding downlink control RF signals and for converting uplink signaling RF signals into corresponding uplink signaling data for the control station 28. Such an interface to the control station 28 allows the operation of the lift car 6 to be remotely monitored and controlled using a common RF link provided by the primary repeater 10. The first combiner/decombiner 24 coupled to the first interface 26, combines the downlink RF signals with the downlink control RF signals for transmission by the gateway antenna 12, and separate uplink RF signals from the uplink signaling RF signals received by the gateway antenna 12. It should be noted that the uplink and downlink RF signals for mobile communication might be signals from one or more mobile communication systems. If the uplink and downlink RF signals are from more than one mobile communication system, the RF signals are combined by the combiner 20 before being fed to the primary repeater 10. The mobile communication systems may, for example, be a GSM900, a DCS1800 and a UMTS system.

The auxiliary repeater 14, which is largely similar to the primary repeater 10, is next described with reference to FIG. 3. The auxiliary repeater 14 includes a second bidirectional amplifier 30, a second combiner/decombiner 32 and a second interface 34. The second bidirectional amplifier 30 amplifies both downlink RF signals, from outside of the lift car 6 and uplink RF signals, from inside of the lift car 6. The second interface 34 is coupled to a signaling and driving system 36 for converting the downlink control RF signals into driver signals for the signaling and driving system 36 and for converting signaling signals from the signaling and driving system 36 into the uplink signaling RF signals. The second combiner/decombiner 32, coupled to the second interface 34, combines the uplink RF signals with the uplink signaling RF signals for transmission by the donor antenna 16, and separates the downlink RF signals from the downlink RF control signals received by the donor antenna 16.

The signaling and driving system 36 is arranged in the lift car 6 and includes at least one driver (not shown) for controlling the lift car 6 based on the driver signals, and at least one sensor (not shown) that produces the signaling signals based on the statuses of the lift car 6. One of the sensors may be adapted to provide information about the location of the lift car 6 within the lift shaft 8 so that the distance of the lift car 6 from the gateway antenna 12 may be determined. This sensor may be connected to the auxiliary repeater 14 so that the information can be used thereby for controlling the gain of the bidirectional amplifier 30 of the auxiliary repeater 14, and to the first interface 26 so that the information can be used by the control station 28 to control the location of the lift car 6 in the lift shaft 8. The signaling and driving system 36 may further include a signal generator (not shown) that is operable by a user of the lift car 6. Examples of such a signal generator include, but are not limited to, those that generate signals when floor and emergency buttons inside the lift car 6 are actuated.

The wireless communication system 4 allows a mobile station 40 (FIG. 1), such a mobile phone, a personal digital assistant (PDA), a handheld computer or any device having wireless access, to have access to its respective mobile communication system outside of the lift shaft 8 when the mobile station 40 is inside the lift car 6. With the wireless communication system 4, the mobile station 40 is able to receive downlink RF signals from outside of the lift shaft 8 that is amplified by the primary repeater 10, transmitted via the gateway antenna 12 into the lift shaft 8 and relayed by the auxiliary repeater 14 into the lift car 6. In the uplink direction, uplink RF signals from the mobile station 40 is received by the server antenna 18, amplified by the auxiliary repeater 14 and transmitted out of the lift car 6 into the lift shaft 8 via the donor antenna 16. The uplink RF signals in the lift shaft 8 are received by the gateway antenna 12 and channeled or relayed outside of the lift shaft 8. In this manner, the mobile station 40 is able to establish a wireless communication link with a mobile communication system so as to remain connectable to the outside world.

In addition to providing wireless communication access for mobile stations 40 in the lift car 6, the wireless communication system 4 also allows the statuses and functions of the lift car 6 to be remotely monitored and controlled respectively from the control station 28. The control station 28 is able to establish a wireless communication link with the signaling and driving system 36 for exchange of data therebetween. Some of the data exchanged between the control station 28 and the signaling and driving system 36 will be described shortly.

The components 30, 32, 34 of the auxiliary repeater 14 are described in detail next. The bidirectional amplifier 30 includes a downlink power amplifier 40 and an uplink power amplifier 42. The input of the downlink power amplifier 30 is connected to the donor antenna 16 via a first transceiver filter 44. The output of the uplink power amplifier 42 is connected to the donor antenna 16 via the first transceiver filter 44. The output of the downlink power amplifier 40 is connected to a control filter 46 of the second combiner/decombiner 32. The control filter 46 is a bandpass filter that filters the downlink control RF signals from the signals received at the donor antenna 16. The control filter 46 is connected to a second transceiver filter 48 for channeling downlink RF signals thereto. The control filter 46 is also connected to a first mixer 50 of the second interface 34 for channeling downlink control RF signals thereto. The second transceiver filter 48 is coupled to the server antenna 18. The second transceiver filter 48 is also connected to a combiner 52 of the second combiner/decombiner 32 for channeling uplink RF signals received by the server antenna 18 thereto. The combiner 52 is also connected to a second mixer 54 of the second interface 34 for receiving the uplink signaling RF signals therefrom. The combiner 52 combines the uplink RF signals and the uplink signaling RF signals and feeds the combined signals to the input of the uplink power amplifier 42.

The auxiliary repeater 14 also includes an automatic power control circuit 56 that receives the output signals of the power amplifiers 40, 42 and information from the sensor regarding the position of the lift car 6 within the lift shaft 8. The automatic power control circuit 56 processes the signals and positional information to generate respective feedback control signals for controlling the gain of the downlink and the uplink power amplifiers 40, 42 so as to maintain an output signal strength thereof within predetermined limits.

The first mixer 50, in addition to receiving the downlink control RF signals, receives a carrier signal from a voltage controlled oscillator (VCO) 58. The first mixer 50 mixes the downlink control RF signals and the carrier signal to produce downlink control baseband signals which are sent to a modem 60 of the second interface 34. The modem 60 demodulates the downlink control baseband signals to the driver signals for the signaling and driving subsystem 36.

The modem 60 also modulates the signaling signals to uplink signaling baseband signals. The second mixer 54 receives the uplink signaling baseband signals and the carrier signal from the VCO 58 to generate the uplink signaling RF signals. The modem 60 may also add headers to the signaling signals for error protection of the signaling signals. Similarly, the modem 60 may strip similar headers from the driver signals before presenting the driver signals to the signaling and driving system 36.

The operation of the bidirectional amplifier 30 and the second combiner/decombiner 32 is briefly described next. RF signals, including combined downlink control RF signals and downlink RF signals, from the donor antenna 16 is channeled by the first transceiver filter 44 to the downlink power amplifier 40 to be thereby amplified. The amplified signal is subsequently filtered by the control filter 46 to separate the downlink control RF signals from the downlink RF signals. The downlink RF signals are channeled via the second transceiver filter 48 to the server antenna 18 to be transmitted via the server antenna 18. Uplink RF signals, from the server antenna 18 is channeled by the second transceiver filter 48 to the combiner 52 to be thereby combined with the uplink signaling RF signals. The combined signals are amplified by the uplink power amplifier 42 and channeled, via the first transceiver filter 44, to the donor antennal 16 for transmission via the donor antenna 16. The components 22, 24, 26 of the primary repeater 10 are similar to, and function in a similar manner as, those of the auxiliary repeater 14, and will therefore not be described again. It suffices to note that in the primary repeater 10, the downlink RF signals and the downlink control RF signals are combined by a combiner 52 of the first combiner/decombiner 24 for transmission via the gateway antenna 12, while the uplink RF signals and the uplink signaling RF signals from the gateway antenna 12 are separated by a control filter 46 of the first combiner/decombiner 24.

Figure 4:
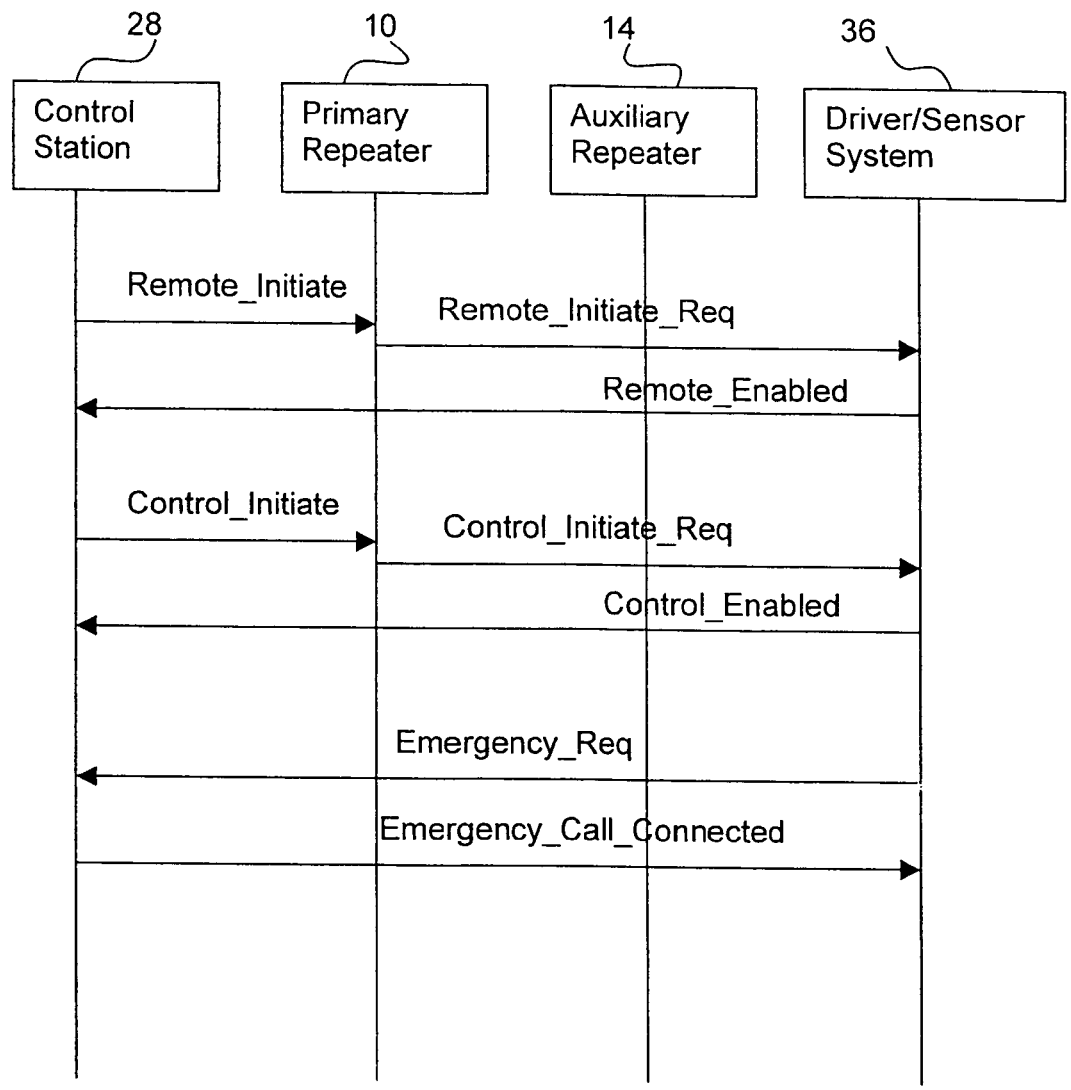
FIG. 4 is a message sequence chart illustrating the exchange of messages between a control station and a signaling and driving system of the lift system in FIG. 1.

Data exchange between the control station 28 and the signaling and driving system 36 is next described with reference to a message sequence chart in FIG. 4. Data exchange is either control station 28 originated or signaling and driving system 36 originated. The control station 28 may initiate data exchange to, for example, perform an operation of requesting for statuses of sensors in the lift system 2, or to perform an operation of controlling a particular function of the lift system 2. When requesting for statuses of sensors, the control station 28 sends a remote_initiate message (downlink control data) to the signaling and driving system 36 via a wireless communication link as described above. This remote_initiate message may be processed by the primary repeater 10, more specifically the modem 60 therein, for example, to add a header as described above. The processed message is then sent to the signaling and driving system 36 as a remote_initiate_req message (driver signals). The driver/sensor system 36 receives the remote_initiate or remote_initiate_req message, processes it by obtaining the statuses of sensors and responds by sending the statuses to the control station 28 via a remote_enabled message (signaling signals). The information about the location of the lift car 6 within the lift shaft 8 may be sent to the control station 28 using such an operation.

To control a function of the lift system 2, such as stepping the lift car 6 by a specified number of steps, the control station 28 sends a control_initiate message (downlink control data) to the signaling and driving system 36. The primary repeater 10 adds a header to the control_initiate message and sends it to the signaling and driving system 36 as a control_initiate_req message (driver signals). The driver/sensor system 36 receives the control_initiate_req message and processes it by controlling the driver specified in the message according to one or more parameters specified in the message. Thereafter, the driver/sensor system 36 responds to the command by letting the control station 28 know if the control operation is successfully executed via a control_enabled message (signaling signals).

The driver/sensor system 36 may also provide an intercom facility. This intercom facility allows the user of the lift car 6 to communicate with the control station 28 by actuating the signal generator. Such a feature is especially useful in situations when the lift system 2 malfunctions, for example, in situations when the lift car is stuck or the lift car door would not open. When communicating with the control station 28 using this intercom facility, the signaling and driving system 36 sends an emergency_req message (signaling signals) to the control station 28. The control system 28 acknowledges this emergency_req message by sending an emergencycall_connected message (downlink control data) to the signaling and driving system 36. With this pair of messages, an intercom call can be established. An emergency call may also be a telephone call to a predetermined telephone number, a short text message sent via a short messaging service (SMS) to a predetermined mobile number, paging or email alerts. The signaling and driving system 36 may also include an automatic fault detection facility that uses this message pair to report a fault condition to the control station 28. Fault correction may then be carried out remotely from the control station 28, for example, using the above-described control operations.

Advantageously, the wireless communication system 4 according to the above-described embodiment of the invention extends RF signal coverage to inside a lift car, which was prior to the invention, substantially impervious to RF signals. With such a system, a mobile station in the lift car has access to its mobile communication system. A call involving a mobile station that was previously established outside of the lift car may also be seamlessly handed over to another base transceiver station (BTS) whose RF signals is accessible in the lift car, when the mobile station moves into the lift car. In addition to allowing mobile communication over an RF link, the wireless communication system also allows the same RF link to be used for remote operations and maintenance of the lift system. In other words, the wireless communication system provides for a single point of RF access for two disparate systems. Such a wireless communication system is thus lower in cost as compared to two separate wireless communication systems for supporting the two disparate systems.

Figure 5:
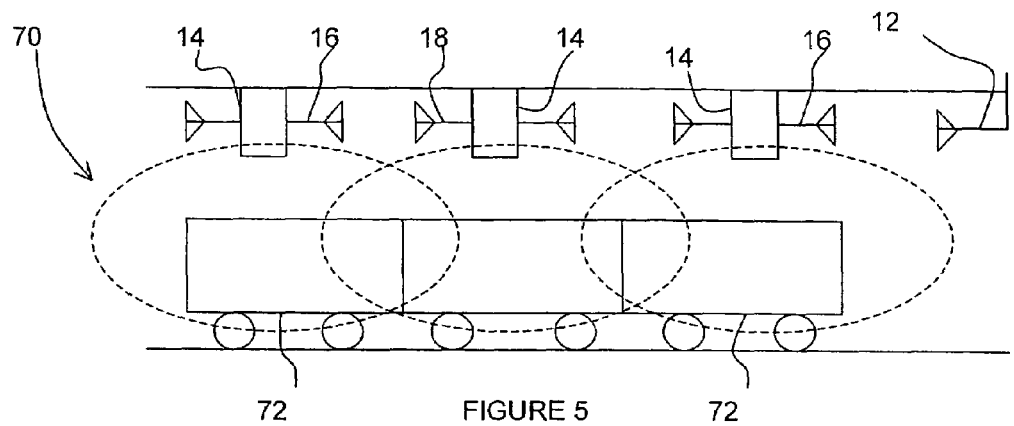
FIG. 5 is a schematic drawing of a wireless communication system, according to another embodiment of the invention, shown in use in a tunnel through which train carriages pass.
Figure 6:
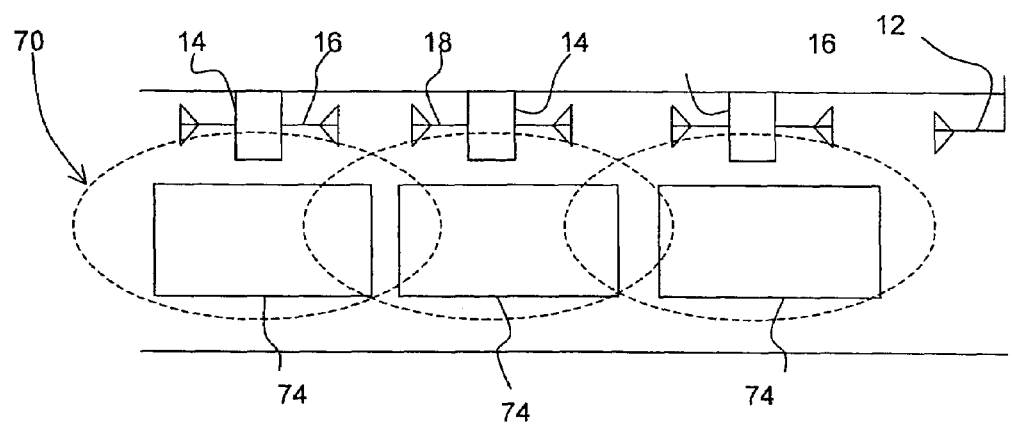
FIG. 6 is a schematic drawing showing the wireless communication system in FIG. 5 being used for operations and maintenance purposes.

Although the invention is described as implemented in a lift system, it is not to be construed to be limited as such. For example, as another embodiment, the invention can be used for extending RF signal coverage inside of a tunnel 70 through which mobile conveyances, such as train carriages 72, pass through as shown in FIG. 5. In such a case, the gateway antenna 12 may be mounted at the entrance to the tunnel 70 so that radiation of RF signals of the gateway antenna 12 is directed inside the tunnel 70. For such an application, especially if the tunnel is long, multiple auxiliary repeaters 14 may be arranged spaced apart from each other in cascade inside the tunnel 70. In this manner, fading RF signals can be received and retransmitted by the auxiliary repeaters 14. In other words, the RF signals are boosted by the auxiliary repeaters 14 along the length of the tunnel 70 so as to cover the tunnel 70. RF signal coverage may thus be substantially uniformly distributed within the tunnel 70. The auxiliary repeaters 14 are able to receive RF transmissions from mobile stations 40 in the tunnel 70 or in train carriages 72 passing through the tunnel 70. As in the embodiment used in the lift car and lift shaft, the auxiliary repeaters 14 may also be used to transmit control data to and receive signaling data from operations and maintenance (OAM) systems 74 in the tunnel 70 as shown in FIG. 6. The OAM systems 74 may also be used in a mine, for example, for remote monitoring and controlling of temperature, pressure and gas levels in the mine. These OAM systems 74 may also be used for remote control of mobile conveyances, such as driver-less coal cars, in the mine, using a control station that is outside the mine.

Figure 7:
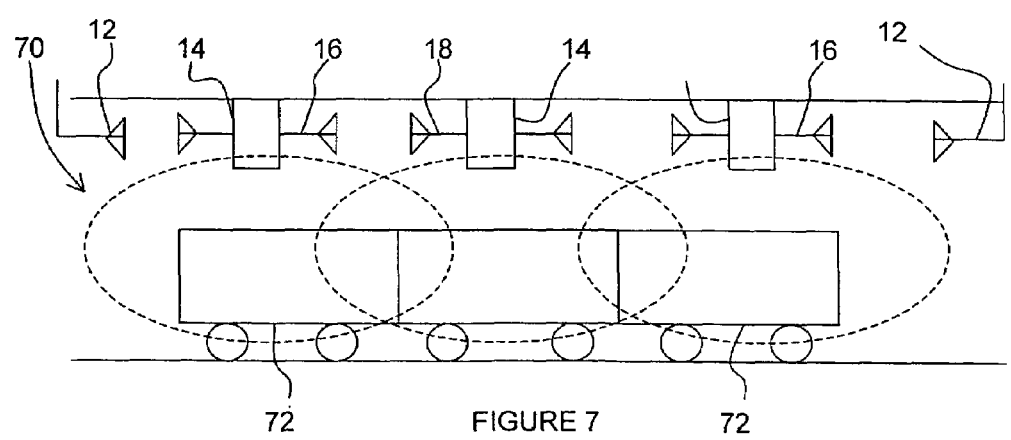
FIG. 7 is a schematic drawing of the wireless communication system in FIG. 5 with an additional gateway antenna.

With any of the above-described embodiments, a second gateway antenna 12 may be placed at another entrance point, such as a second entrance, of the tunnel 70, to serve as a backup for the first gateway antenna 12 in case the first gateway antenna fails. Such a redundant arrangement is shown in FIG. 7. Alternatively, the second gateway antenna 12 may be used to radiate RF signals of a different mobile communication system from that of the first gateway antenna 12 into the tunnel 70. In this manner, RF signal coverage of two or more mobile communication systems is made available inside the tunnel 70.

Figure 8:
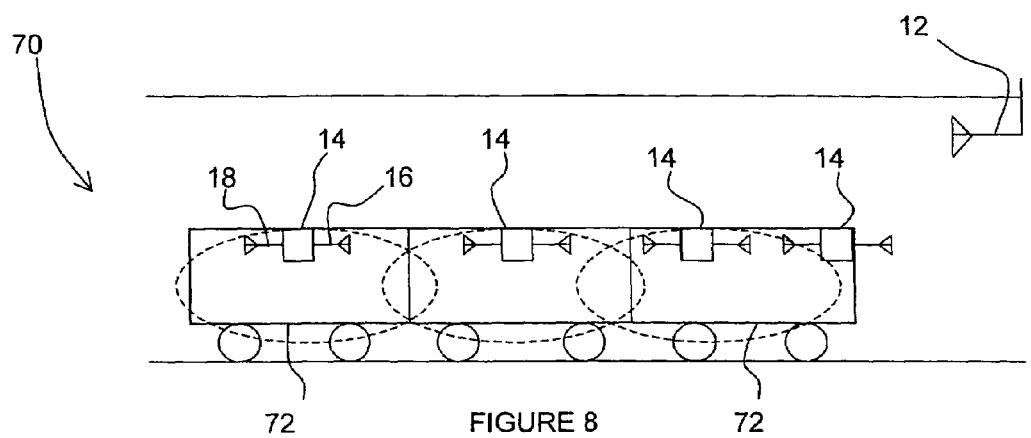
FIG. 8 is a schematic drawing of a wireless communication system, according to yet another embodiment of the invention, wherein multiple auxiliary repeaters are mounted inside train carriages.
Figure 9:
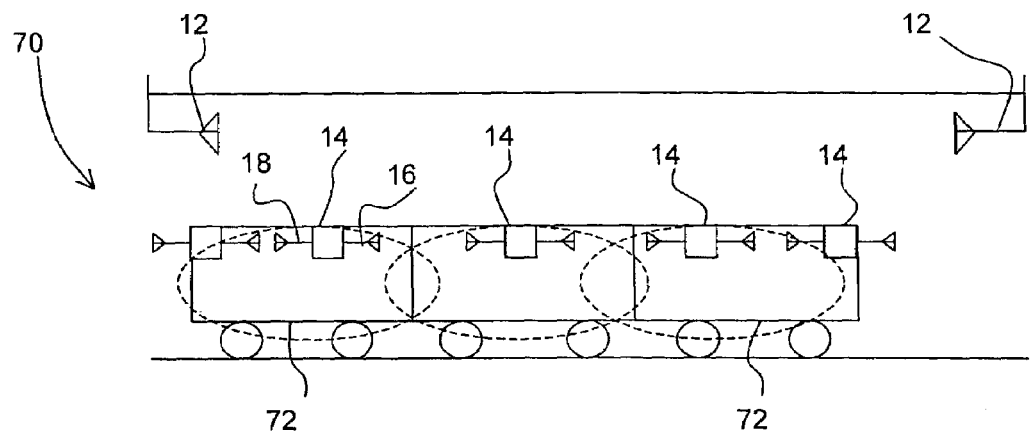
FIG. 9 is a schematic drawing of the wireless communication system in FIG. 8 with an additional gateway antenna.

In a multi-auxiliary repeater embodiment with mobile conveyances, the auxiliary repeaters 14 may be placed in the mobile conveyances, such as the train carriages 72 as shown in FIG. 8 to provide stronger RF signals in the train carriages 72. A donor antenna 16, coupled to a leading auxiliary repeater 14, is arranged outside of a leading train carriage 72. The donor antennas 16, coupled to the other auxiliary repeaters 14 and the server antennas 18 coupled to the auxiliary repeaters 14 are arranged inside the respective train carriages 72. The leading auxiliary repeater 14 functions as a primary or gateway repeater and the server antenna 16 coupled thereto functions as a gateway antenna. Another trailing auxiliary repeater 14, also functioning as a primary repeater, may be similarly mounted on a trailing train carriage 72 as shown in FIG. 9 to provide a redundant system or to provide a coverage of a different RF signal as described above. Other auxiliary repeaters 14 may also be arranged in the tunnel 70 outside of the train carriages 72 so that strong RF signals are available both inside and outside of the train carriages.

What is claimed is:

1. A wireless communication system providing improved communications between a cell phone in an enclosed environment that is at least substantially shielded from RF signals, and a cell phone system located outside of the enclosed environment, the wireless communication system comprising:

a primary repeater operable to receive cell system downlink RF signals and transmit primary repeater uplink RF signals to the cell phone system;

at least one auxiliary repeater arranged within the enclosed environment;

at least one gateway antenna, coupled to the primary repeater, arranged at an entrance point of the enclosed environment so as to radiate primary repeater downlink RF signals into the enclosed environment and receive auxiliary repeater uplink RF signals from the auxiliary repeater;

a donor antenna coupled to the auxiliary repeater, said donor antenna and auxiliary repeater being operable to receive primary repeater downlink RF signals from the primary repeater and radiate auxiliary repeater uplink RF signals to the primary repeater; and a server antenna coupled to the auxiliary repeater, said server antenna and auxiliary repeater being operable to receive cell phone uplink RF signals from the cell phone within the enclosed environment and radiate auxiliary repeater downlink RF signals to said cell phone;

a first interface that is coupled to a control station for converting downlink control data into corresponding downlink control RF signals and for converting uplink signaling RF signals into corresponding uplink signaling data;

a first combiner/decombiner that is coupled to the first interface for combining the downlink RF signals with the downlink control RF signals for transmission by the gateway antenna, and for separating uplink RF signals from the uplink signaling RF signals received by the gateway antenna;

a second interface that is coupled to a signaling and driving system for converting the downlink control RF signals into driver signals and for converting signaling signals into the uplink signaling RF signals; and a second combiner/decombiner that is coupled to the second interface for combining the uplink RF signals with the uplink signaling RF signals for transmission by the donor antenna of the auxiliary repeater, and for separating the downlink RF signals from the downlink control RF signals received by the donor antenna of the auxiliary repeater;

wherein the auxiliary repeater and primary repeater downlink RF signals convey information in the cell phone system downlink signal to the cell phone and the auxiliary repeater and primary repeater uplink RF signals convey information in the cell phone uplink signal to the cell phone system, to maintain communications between the cell phone and the cell phone system;

wherein the auxiliary repeater is mounted on a mobile conveyance movable in the enclosed environment with the donor antenna located outside the mobile conveyance and the server antenna located inside the mobile conveyance; and wherein the enclosed environment is a lift shaft, the mobile conveyance is a lift car and the gateway antenna is arranged at a ceiling of the lift shaft.

2. A wireless communication system according to claim 1, wherein the auxiliary repeater comprises a bidirectional amplifier having a gain that is adjustable based on a distance between the mobile conveyance and the gateway antenna.

3. A wireless communication system according to claim 1, comprising a plurality of additional auxiliary repeaters arranged spaced apart from each other in a cascade within the enclosed environment.

4. A wireless communication system according to claim 3, comprising a plurality of gateway antennas arranged at respective entrance points of the enclosed environment.

5. A wireless communication system according to claim 1, wherein the signaling and driving system is arranged in the mobile conveyance and comprises a driver for controlling the mobile conveyance based on the driver signals, and a sensor for producing the signaling signals based on a status of the mobile conveyance.

6. A wireless communication system according to claim 1, wherein the signaling and driving system further comprises a signal generator being operable by an operator of the mobile conveyance.

7. A wireless communication system according to claim 1, further comprising:
a first interface that is coupled to a control station for converting downlink control data into corresponding primary repeater downlink control RF signals and for converting auxiliary repeater uplink signaling RF signals into corresponding uplink signaling data;

a first combiner/decombiner that is coupled to the first interface for combining the downlink RF signals with the primary repeater downlink control RF signals for transmission by the gateway antenna, and for separating auxiliary repeater uplink RF signals from the auxiliary repeater uplink signaling RF signals received by the gateway antenna;

a second interface that is coupled to a signaling and driving system for converting the primary repeater downlink control RF signals into driver signals and for converting signaling signals into the auxiliary repeater uplink signaling RF signals; and a second combiner/decombiner that is coupled to the second interface for combining the auxiliary repeater uplink RF signals with the auxiliary repeater uplink signaling RF signals for transmission by the donor antenna of the auxiliary repeater, and for separating the primary repeater downlink RF signals from the primary repeater downlink control RF signals received by the donor antenna of the auxiliary repeater.

* * * * *